(12) United States Patent
Chang et al.

(10) Patent No.: US 8,762,897 B2
(45) Date of Patent: Jun. 24, 2014

(54) SEMICONDUCTOR DEVICE DESIGN SYSTEM AND METHOD OF USING THE SAME

(75) Inventors: Chih-Hsien Chang, New Taipei (TW); Yung-Chow Peng, Hsinchu (TW); Fu-Lung Hsueh, Kaohsiung (TW)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 0 days.

(21) Appl. No.: 13/475,853

(22) Filed: May 18, 2012

(65) Prior Publication Data

US 2013/0311957 A1 Nov. 21, 2013

(51) Int. Cl.
G06F 17/50 (2006.01)
G03F 1/00 (2012.01)
G21K 5/00 (2006.01)
G06F 19/00 (2011.01)

(52) U.S. Cl.
CPC ........ *G06F 17/5081* (2013.01); *G06F 2217/12* (2013.01); *G06F 19/00* (2013.01); *G03F 1/00* (2013.01); *G21K 5/00* (2013.01)
USPC ................. 716/51; 716/54; 716/55; 716/111; 430/5; 378/35; 700/98; 700/121

(58) Field of Classification Search
CPC . G06F 17/5081; G06F 19/00; G06F 2217/12; G03F 1/00; G21K 5/00
USPC ........... 716/111, 107, 51, 136; 430/5; 378/35; 700/98, 121
See application file for complete search history.

(56) References Cited

U.S. PATENT DOCUMENTS

| | | | |
|---|---|---|---|
| 6,298,319 B1 * | 10/2001 | Heile et al. ...................... 703/26 |
| 6,505,323 B1 * | 1/2003 | Lipton et al. .................. 716/112 |
| 6,988,253 B1 * | 1/2006 | Lipton et al. .................. 716/112 |
| 7,937,678 B2 * | 5/2011 | Lippmann et al. ............ 716/103 |
| 8,434,033 B2 * | 4/2013 | Abou Ghaida et al. .......... 716/55 |
| 8,473,873 B2 * | 6/2013 | Hsu et al. ......................... 716/51 |
| 2001/0041297 A1 * | 11/2001 | Nishi ................................ 430/5 |
| 2004/0036846 A1 * | 2/2004 | Nishi .............................. 355/18 |
| 2004/0168139 A1 * | 8/2004 | Chevallier et al. ................ 716/5 |
| 2006/0200789 A1 * | 9/2006 | Rittman .......................... 716/19 |
| 2008/0115102 A1 * | 5/2008 | Rittman .......................... 716/19 |
| 2010/0192115 A1 * | 7/2010 | Yang et al. ........................ 716/5 |
| 2012/0023471 A1 * | 1/2012 | Fischer et al. ................ 716/115 |
| 2013/0024822 A1 * | 1/2013 | Hsieh et al. ..................... 716/52 |
| 2013/0055184 A1 * | 2/2013 | Shroff et al. .................. 716/112 |
| 2013/0061185 A1 * | 3/2013 | Abou Ghaida et al. .......... 716/55 |
| 2013/0061186 A1 * | 3/2013 | Hsu et al. ......................... 716/55 |
| 2013/0091476 A1 * | 4/2013 | Chen et al. ...................... 716/55 |
| 2013/0132913 A1 * | 5/2013 | Fu et al. .......................... 716/51 |
| 2013/0205266 A1 * | 8/2013 | Chen et al. ...................... 716/55 |

* cited by examiner

*Primary Examiner* — Phallaka Kik
(74) *Attorney, Agent, or Firm* — Lowe Hauptman & Ham, LLP

(57) ABSTRACT

A circuit design system includes a schematic design tool configured to generate schematic information and pre-coloring information for a circuit. The circuit design system also includes a netlist file configured to store the schematic information and the pre-coloring information on a non-transitory computer readable medium and an extraction tool configured to extract the pre-coloring information from the netlist file. A layout design tool, included in the circuit design system, is configured to design at least one mask based on the schematic information and the pre-coloring information. The circuit design system further includes a layout versus schematic comparison tool configured to compare the at least one mask to the schematic information and the pre-coloring information.

21 Claims, 6 Drawing Sheets

US 8,762,897 B2

SEMICONDUCTOR DEVICE DESIGN SYSTEM AND METHOD OF USING THE SAME

BACKGROUND

As technology nodes decrease, the density of features on a substrate increases. In some instances the density of features of a layout design is higher than resolution capabilities of a single mask lithography process. When more than one mask is utilized to transfer the layout design to a wafer, a layout engineer must determine which features to place on each mask. Due to variations during manufacturing processes, features formed using different masks occasionally experience a mismatch, i.e., shapes of features transferred to the wafer by different masks are slightly different even when the desired shapes are the same. The resulting mismatch adversely impacts the performance of circuits formed by the features. In some instances, the mask related mismatches cause the circuits to fail quality control tests resulting in a lower production yield.

To help reduce the number of mask related mismatches, a circuit designer includes instructions regarding which features to form using the same mask. The layout engineer receives the instructions and designs the mask accordingly. However, confirming the accuracy of the layout design in comparison with the circuit design is performed manually and in some instances errors are overlooked.

DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are of course, merely examples and are not intended to be limiting.

Figure 1:
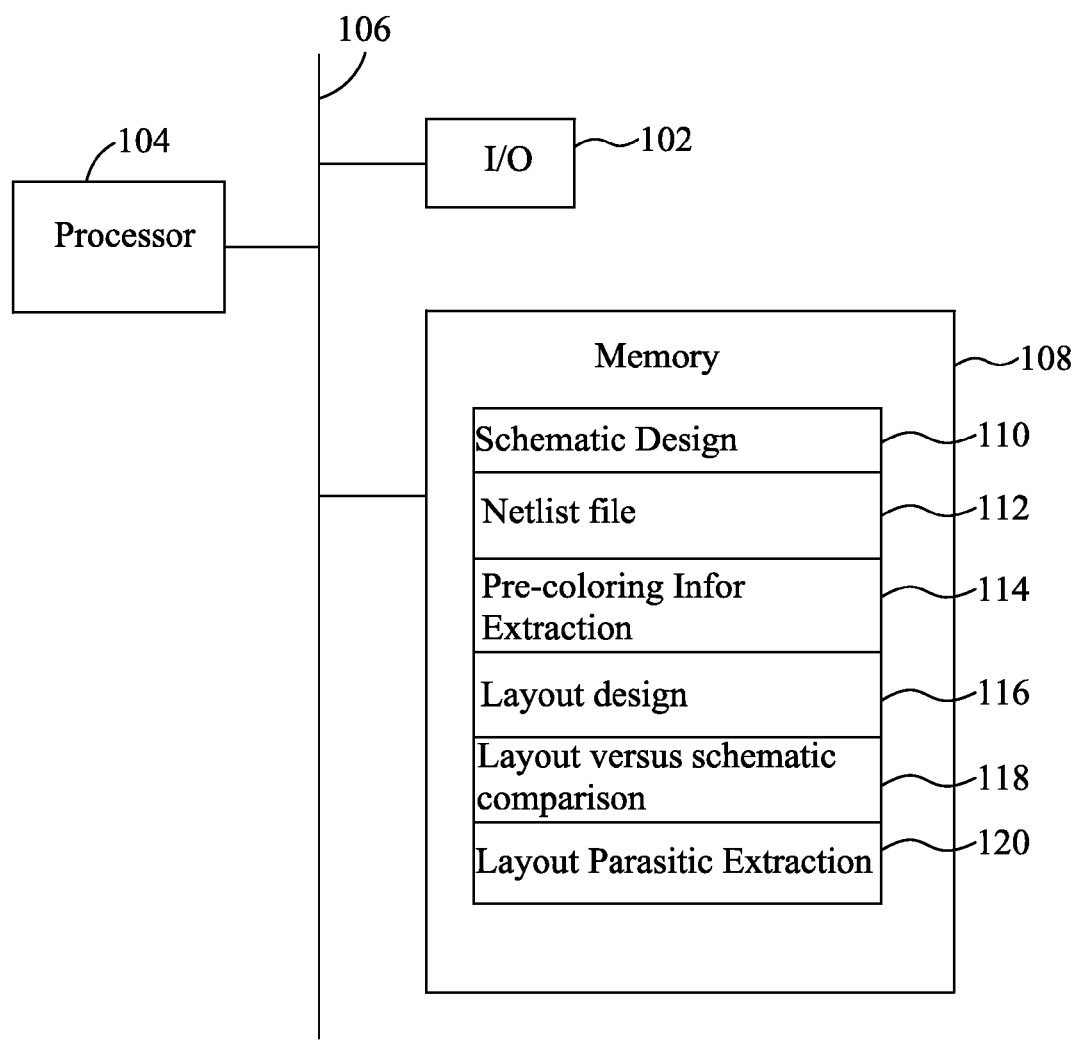
FIG. 1 is a block diagram of a semiconductor device designing system according to one or more embodiments.

FIG. 1 is a block diagram of a semiconductor device designing system 100. Semiconductor device designing system 100 includes an input/output (I/O) 102 configured to receive inputs and transmit outputs to external circuits. I/O 102 is electrically connected to a processor 104 via a bus 106. I/O 102 and processor 104 are electrically connected to a memory 108 via bus 106. Memory 108 includes several blocks used to design a semiconductor device. A schematic design block 110 is configured to generate a schematic circuit design including schematic information and pre-coloring information. A netlist file 112 is used to store the schematic information and the pre-coloring information generated using schematic design block 110. A pre-coloring information extraction block 114 is configured to recognize and extract pre-coloring information stored in netlist file 112. A layout design block 116 is configured to receive the schematic information from netlist file 112 and the pre-coloring information from either netlist file 112 or pre-coloring information extraction block 114. Layout design block 116 is configured to generate mask patterns based on the schematic information and the pre-coloring information. A layout versus schematic (LVS) comparison block 118 is configured to compare the schematic circuit design to the mask patterns based on the schematic information and the pre-coloring information. A layout parasitic extraction (LPE) block 120 is configured to perform a parasitic resistance and capacitance simulation based on the schematic information and the pre-coloring information.

In some embodiments, the processes described with respect to one or more of blocks 110, 112, 114, 116, 118 and 120 are implemented, in at least some embodiments, by a processor, e.g., processor 104, which is programmed for performing such processes. One or more of the memory 108, I/O 102, and bus 106 is/are operable to receive design rules and/or other parameters for processing by processor 104. One or more of memory 108, I/O 102, and bus 106 is/are operable to output the data as determined by processor 104 using blocks 110, 112, 114, 116, 118 and 120. Memory 108 comprises, in some embodiments, a random access memory (RAM) and/or other dynamic storage device and/or read only memory (ROM) and/or other static storage device, coupled to bus 106 for storing data and instructions to be executed by processor 104. I/O 102 comprises an input device, an output device and/or a combined input/output device for enabling user interaction with semiconductor device designing system 100.

In some embodiments, the processes are implemented as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Schematic design block 110 is used to generate the schematic circuit design of the semiconductor device. In some embodiments, the semiconductor device is a circuit comprising wires or buses. In some embodiments, the semiconductor device includes transistors, diodes, fuses or other suitable components. In some embodiments, schematic design block 110 includes a computer aided design (CAD) program.

Figure 2:
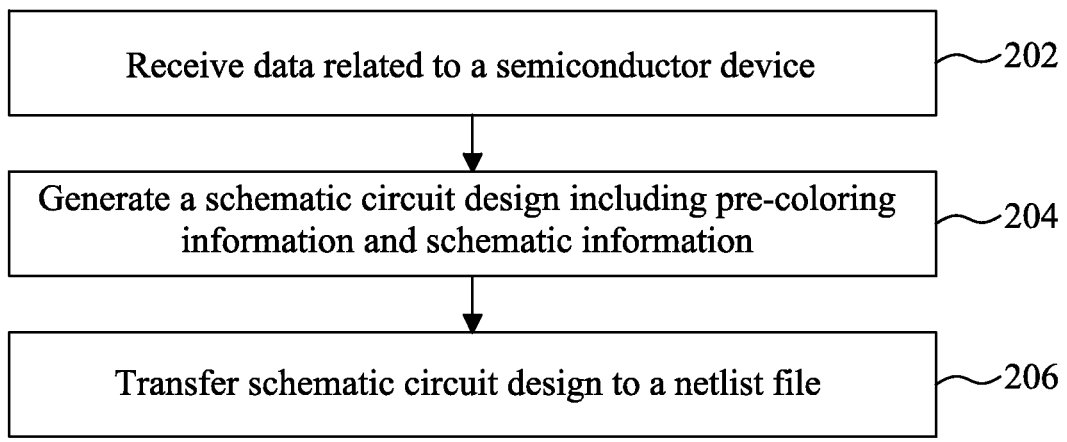
FIG. 2 is a flowchart of a process performed by a schematic design block of the semiconductor device designing system according to one or more embodiments.

FIG. 2 is a flowchart for a process 200 performed using schematic design block 110. In operation 202, schematic design block 110 receives data related to a semiconductor device. In some embodiments, schematic design block 110 receives the data from a circuit designer operating semiconductor device designing system 100. The data includes both schematic information and pre-coloring information.

Pre-coloring information is information related to the location at which a feature is formed within the semiconductor device, e.g., metal layer distance from a substrate, as well as physical dimensions of the features, e.g., width, length, thickness, etc. For example, for a wire connection level, the pre-coloring information identifies wires to be formed at a specific metal layer or a group of wires which are to be formed using a same mask. For a device level, pre-coloring information identifies a mask layer of the device or a group of devices which are to be formed using a same mask.

In some embodiments, every element in the schematic diagram is associated with pre-coloring information. In some embodiments, less than every element in the schematic diagram is associated with pre-coloring information. The circuit designer inputs the pre-coloring information by including a reference character at a beginning of each entry of the pre-coloring information. The reference character denotes that the information following the reference character is pre-coloring information and does not impact the schematic diagram of the semiconductor device.

Returning to FIG. 2, in operation 204, schematic design block 110 generates a schematic circuit design including pre-coloring information. In operation 206, schematic design block 110 transfers the schematic circuit design including pre-coloring information to netlist file 112. Pre-coloring information transferred to the netlist file 112 is designated by the reference character.

Figure 3:
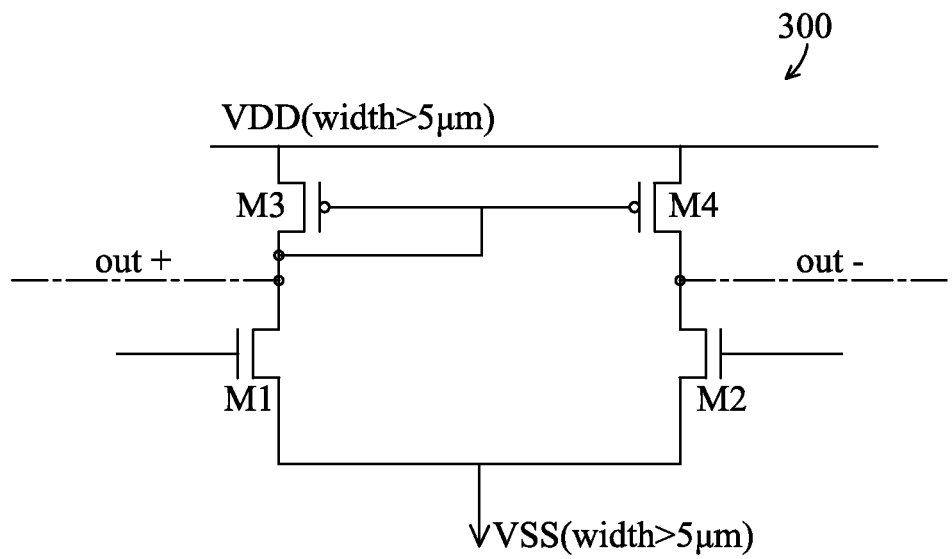
FIG. 3 is a schematic diagram of an example circuit according to one or more embodiments.

FIG. 3 is a schematic diagram of an example circuit 300. Circuit 300 is a differential amplifier. However, this circuit diagram is used only for illustration purposes and is not intended to be limiting. Circuit 300 includes two n-type metal-oxide-semiconductor (NMOS) transistors, M1 and M2. Sources of transistors M1 and M2 are connected to a voltage source source (VSS) signal. Gates of transistors M1 and M2 are connected to external devices. Drains of transistors M1 and M2 are electrically connected to drains of p-type metal-oxide-semiconductor (PMOS) transistors M3 and M4, respectively. Sources of transistors M3 and M4 are connected to a voltage drain drain (VDD) signal. A gate of transistor M3 is connected to a gate of transistor M4 as well as to the drain of transistor M3. Between transistor M1 and transistor M3 is a first output node out+. Between transistor M2 and transistor M4 is a second output node out−.

Dash-dot lines connected to output nodes out+ and out− are used to indicate these lines should be formed using the same mask. Similarly the parenthetical information regarding the width of VDD and VSS, is used to indicate a minimize width of metal lines used to form VDD and VSS. This information is a type of pre-coloring information.

Netlist file 112 stores the schematic information and the pre-coloring information generated using schematic design block 110 in a format which facilitates transferring the information between different blocks of semiconductor designing system 100 or between separate semiconductor designing systems.

Figure 4:
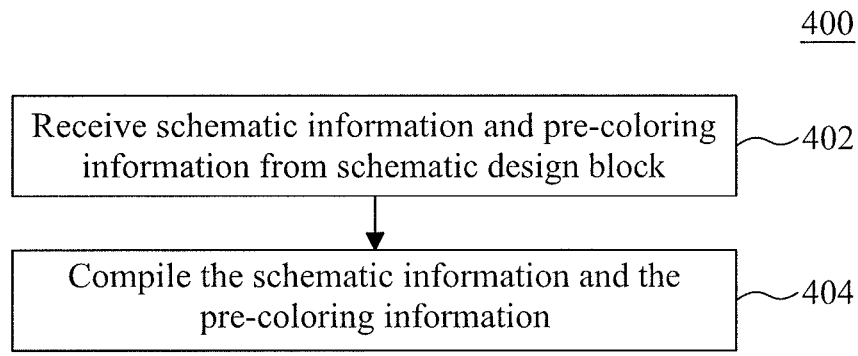
FIG. 4 is a flowchart of a process for creating a netlist file of the semiconductor device designing system according to one or more embodiments.

FIG. 4 is a flow chart of a process of transferring information to a netlist file (e.g., netlist file 112). In operation 402, netlist file 112 receives the schematic information and the pre-coloring information from schematic design block 110. The pre-coloring information received by netlist file 112 is designated by the reference character. In operation 404, netlist file 112 compiles the schematic information and the pre-coloring information into a format which facilitates transfer of the schematic information and the pre-coloring information. The format facilitates transfer of the schematic information and the pre-coloring information because the pre-coloring information is designated by the reference character to allow different blocks or semiconductor designing systems to distinguish between the schematic information and the pre-coloring information.

Figure 5:
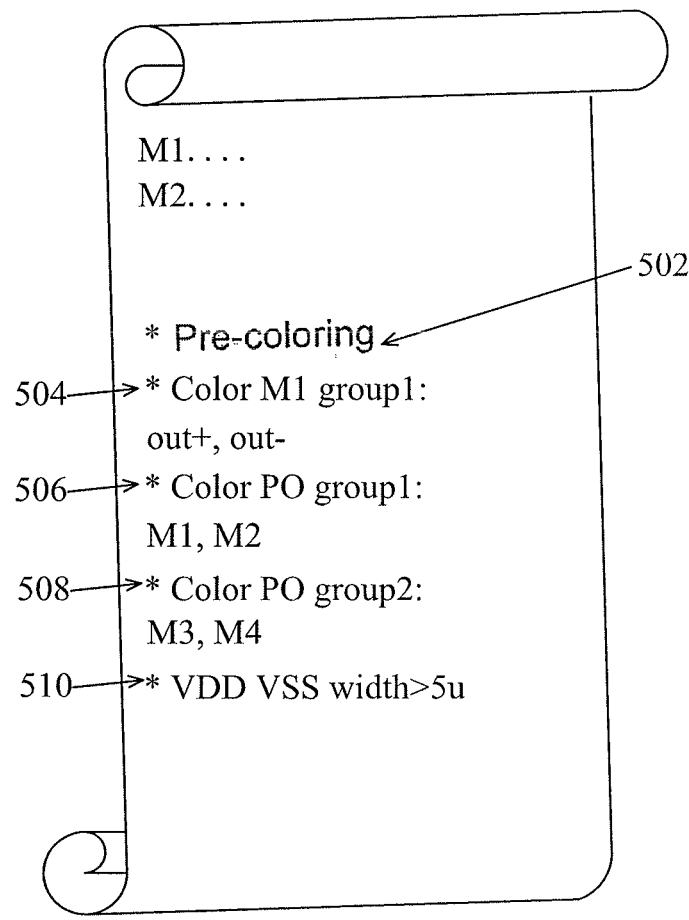
FIG. 5 is an example of a netlist file corresponding to the exemplary circuit of FIG. 2A according to one or more embodiments.

FIG. 5 is an example of a netlist file corresponding to the schematic diagram of FIG. 3. In the example netlist file '*' is the reference character. In some embodiments, the reference character is a different character. In some embodiments, the reference character is a combination of characters. An initial entry 502 indicates the following information is related to pre-coloring information. Subsequent entries indicate a metal layer, a mask number and corresponding features. For example, a first entry 504 "Color M1 group 1: out+, out−" is interpreted as features out+ and out− being formed in metal layer 1 ("Color M1") using mask 1 ("group 1"). A second entry 506 "Color PO group 1: M1, M2" is interpreted as features M1 and M2 formed in polysilicon layer ("Color PO") using mask 1 ("group 1"). A third entry 508 "Color PO group 2: M3, M4" is interpreted as features M3 and M4 formed in the polysilicon layer ("Color PO") using mask 2 ("group 2"). A fourth entry 510 "VDD, VSS width>5μ" is interpreted as features VDD and VSS have a width greater than 5 μm ("width>5μ"). The precise syntax of the information is merely used for clarity. One of ordinary skill will recognize the syntax is capable of alteration.

Pre-coloring information extraction block 114 extracts the pre-coloring information from netlist file 112. In some embodiments, pre-coloring information extraction block 114 recognizes the reference character and extracts the pre-coloring information from netlist file 112 based on recognition of the reference character. In some embodiments, pre-coloring information extraction block 114 transmits the extracted pre-coloring information to other blocks. In some embodiments, pre-coloring information extraction block 114 transmits the extracted pre-coloring information to other semiconductor device designing systems. In some embodiments, other blocks, e.g., layout design block 116, LVS comparison block 118, LPE block 120, include a pre-coloring information extraction ability.

Figure 6:
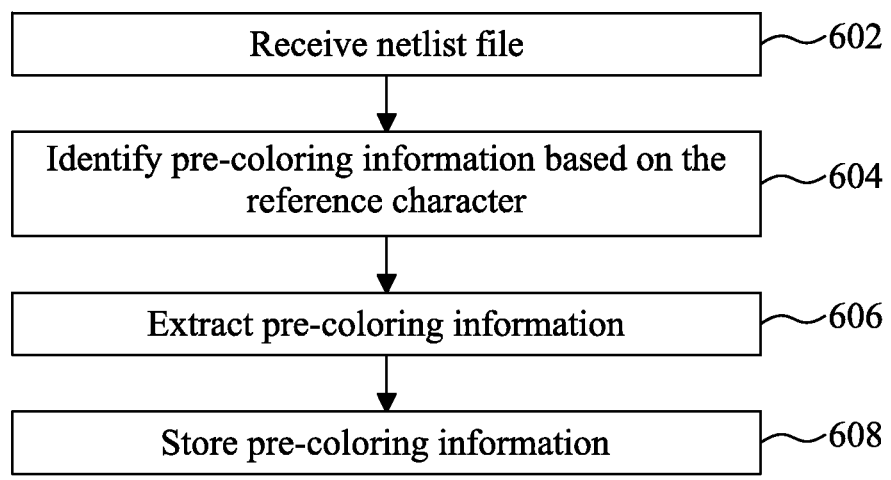
FIG. 6 is a flowchart of a process performed by a pre-coloring information extraction block of the semiconductor device designing system according to one or more embodiments.

FIG. 6 is a flowchart of a process 600, according to one or more embodiments, performed by execution of pre-coloring information extraction block 114. In operation 602, pre-coloring information extraction block 114 receives netlist file 112. In operation 604, pre-coloring information extraction block 114 identifies the pre-coloring information in netlist file 112 based on the reference character. In operation 606, pre-coloring information extraction block 114 extracts the pre-coloring information from netlist file 112. In operation 608, pre-coloring information extraction block 114 stores the pre-coloring information for transmission to other blocks or semiconductor device designing systems. In some embodiments, pre-coloring information extraction block 114 transmits the pre-coloring information using a wired connection to the other blocks or semiconductor device designing systems.

Layout design block 116 generates the layout pattern comprising masks for patterning a wafer to form the semiconductor device. In some embodiments, a number of masks for patterning the wafer to form the semiconductor device is more than one. In some embodiments, a layout designer uses the schematic information and the pre-coloring information to produce the layout pattern. In some embodiments, layout design block 116 includes a CAD program.

By using both the schematic information and the pre-coloring information, the layout design block 116 is able to assign features to specific masks in a manner which reduces mismatches created by formation using different masks. The pre-coloring information also provides the layout design block 116 with information regarding required dimensions of the features.

Figure 7:
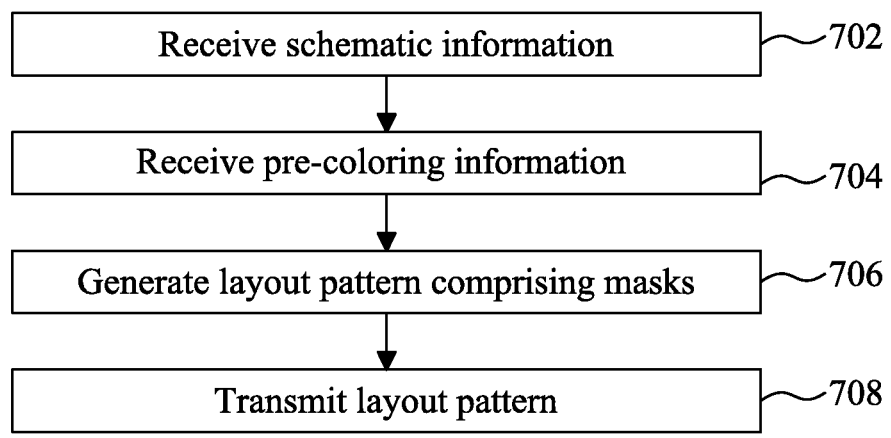
FIG. 7 is a flowchart of a process performed by a layout design block of the semiconductor device designing system according to one or more embodiments.

FIG. 7 is a flowchart of a process 700, according to one or more embodiments, performed by execution of layout design block 116. In operation 702, layout design block 116 receives the schematic information from netlist file 112. In operation 704, layout design block 116 receives the pre-coloring information. In some embodiments, layout design block 116 receives the pre-coloring information from netlist file 112 by using an internal functionality to recognize the reference character and extracting the pre-coloring information. In some embodiments, layout design block 116 receives the pre-coloring information from pre-coloring information extraction block 114. In operation 706, layout design block 116 generates the layout pattern comprising masks for patterning the wafer based on the schematic information and the pre-coloring information. In operation 708, layout design block 116 transmits the layout pattern to other blocks or semiconductor device design systems. In some embodiments, layout design block 116 transmits the layout pattern using a wired connection to the other blocks or semiconductor device designing systems.

LVS comparison block 118 compares the schematic circuit design of the semiconductor device with the layout pattern taking into account the pre-coloring information. LVS comparison block 118 determines whether the layout pattern accurately combines the schematic information and the pre-coloring information. LVS comparison block 118 compares whether elements of the schematic circuit design are incorporated into the specified mask based on the pre-coloring information. LVS comparison block 118 also compares element dimensions identified in the schematic circuit design using pre-coloring information to determine the accuracy of the layout pattern. If LVS comparison tool 110 determines an error occurred in the layout pattern, the error is reported to the layout designer or the circuit designer.

Figure 8:
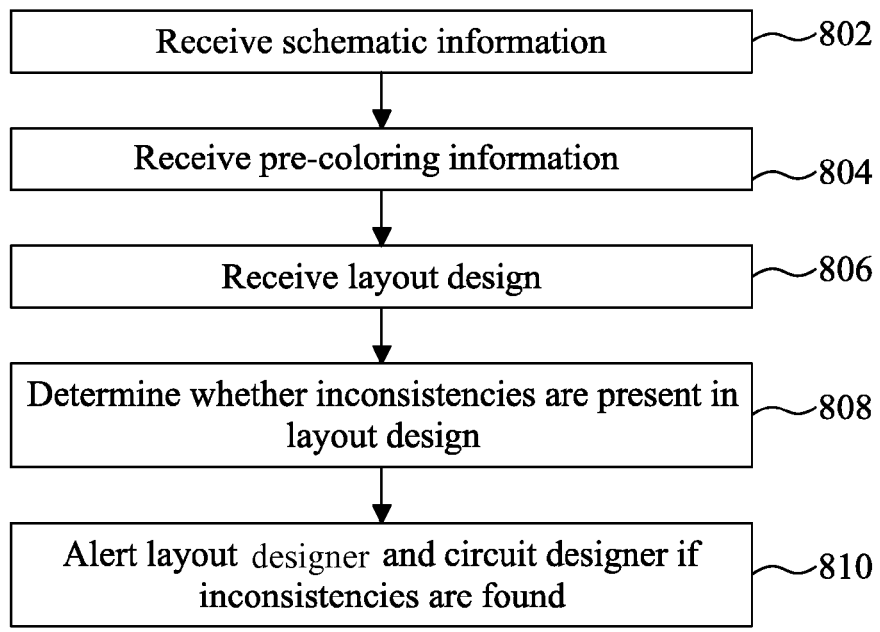
FIG. 8 is a flowchart of a process performed by a layout versus schematic comparison block of the semiconductor device designing system according to one or more embodiments.

FIG. 8 is a flowchart of a process 800, according to one or more embodiments, performed by execution of LVS comparison block 118. In operation 802, LVS comparison block 118 receives the schematic information from netlist file 112. In operation 804, LVS comparison block 118 receives the pre-coloring information. In some embodiments, LVS comparison block 118 receives the pre-coloring information from netlist file 112 by using an internal functionality to recognize the reference character and extracting the pre-coloring information. In some embodiments, LVS comparison block 118 receives the pre-coloring information from pre-coloring information extraction block 114. In operation 806, LVS comparison block 118 receives the layout design from layout design block 116. In operation 808, LVS comparison block 118 determines whether errors are present in the layout design. LVS comparison block 118 determines whether any inconsistencies exist between the schematic diagram and the layout pattern taking into account the pre-coloring information. In operation 810, LVS comparison block 118 alerts the layout designer and the circuit designer if inconsistencies are found. In some embodiments, LVS comparison block 118 alerts the layout designer and the circuit designer using a visual alert or an auditory alert. In some embodiments, LVS comparison block 118 alerts the layout designer and circuit designer using an email message.

LPE block 120 performs a parasitic resistance and capacitance simulation on the schematic circuit design of the semiconductor device using the pre-coloring information. LPE block 120 predicts behavior of the semiconductor device. In some embodiments including multiple masks, LPE block 120 incorporates information from more than one mask to determine the parasitic capacitance and resistance of elements of the schematic circuit design. In some embodiments, LPE block 120 includes a simulation program with integrated circuit emphasis (SPICE).

Figure 9:
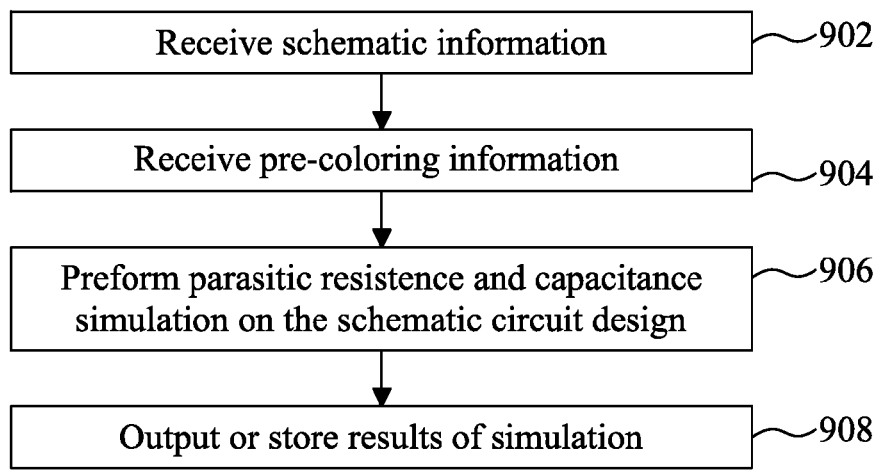
FIG. 9 is a flowchart of a process performed by a layout parasitic extraction block of the semiconductor device designing system according to one or more embodiments.

FIG. 9 is flow chart of a process 900, according to one or more embodiments, performed by execution of LPE block 120. In operation 902, LPE block 120 receives the schematic information from netlist file 112. In operation 904, LPE block 120 receives the pre-coloring information. In some embodiments, LPE block 120 receives the pre-coloring information from netlist file 112 by using an internal functionality to recognize the reference character and extracting the pre-coloring information. In some embodiments, LPE block 120 receives the pre-coloring information from pre-coloring information extraction block 114. In operation 906, LPE block 120 performs a parasitic resistance and capacitance simulation on the schematic circuit design using the pre-coloring information. In operation 908, LPE block outputs or stores the results of the simulation. In some embodiment, the results are transmitted to the circuit designer so the circuit designer can determine whether to alter to the circuit diagram to satisfy quality control standards.

In comparison with conventional technology, semiconductor device designing system 100 eliminates errors which occur during manual comparison of the layout design and the circuit design. Semiconductor device designing system 100 also enables a more accurate simulation of the functionality of the circuit because more information is made available to LPE block 120. Thus, semiconductor device designing system 100 helps to reduce cost and material used to form test circuits because the accuracy of the simulation of the circuit is increased.

Figure 10:
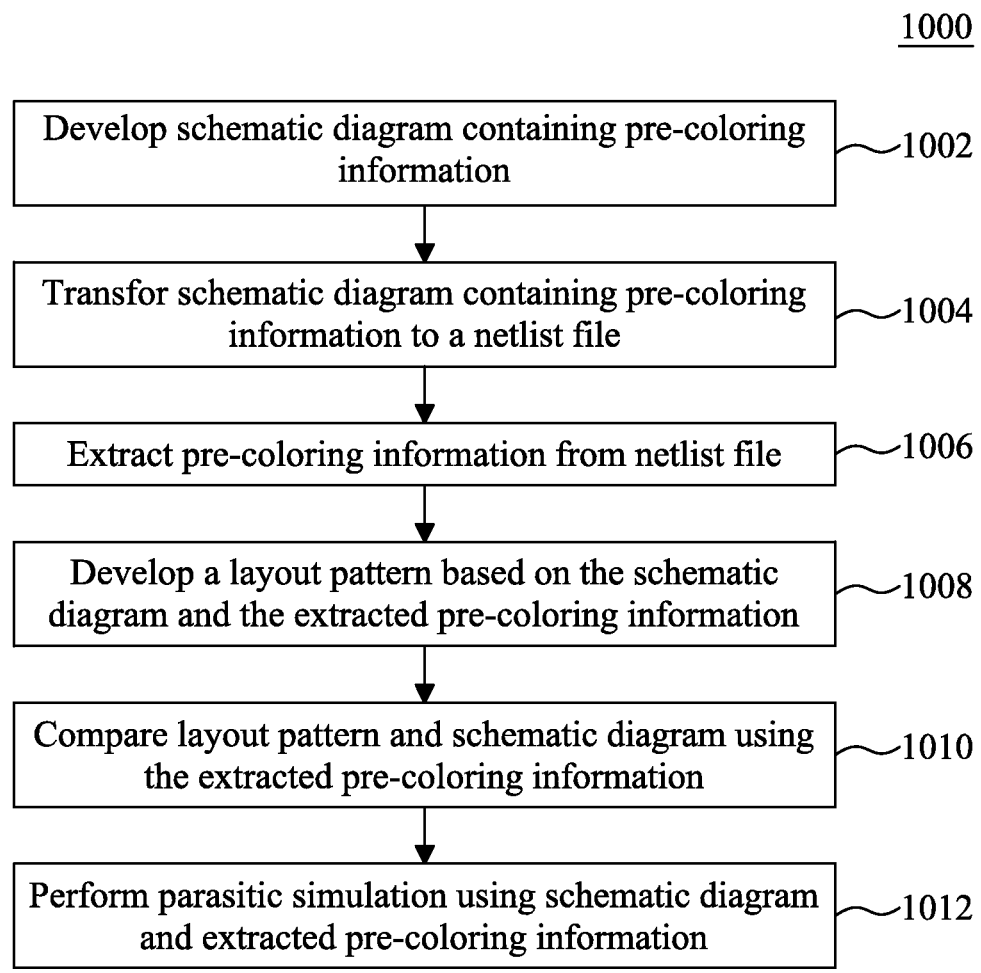
FIG. 10 is a flow chart for a method of designing a semiconductor device using the semiconductor device designing system of FIG. 1 according to one or more embodiments.

FIG. 10 is a flow chart for a method 1000 of designing a semiconductor device using the semiconductor device designing system 100. Method 1000 begins with operation 1002 in which a schematic circuit design is developed. The schematic circuit design is developed using schematic design block 110. The schematic circuit design includes both schematic information and pre-coloring information.

In operation 1004, the schematic circuit design containing the pre-coloring information is transferred to netlist file 112. The transfer of the schematic diagram includes transferring both schematic information and pre-coloring information to netlist file 112. The pre-coloring information is identified using the reference character. The reference character serves as an identification source to facilitate subsequent extraction of the pre-coloring information from netlist file 112.

In optional operation 1006, pre-coloring information is extracted from the netlist file. The pre-coloring information is extracted from netlist file 112 using pre-coloring extraction block 114. Pre-coloring extraction block 114 identifies the pre-coloring information using the reference character. Pre-coloring extraction block 114 either stores the pre-coloring information for later transmission or transmits the pre-coloring information immediately to other components of semiconductor device designing system 100. If optional operation 1006 is not used, then at least one of layout design block 116, LVS comparison block 118 or LPE block 120 includes an extraction function to recognize the pre-coloring information in netlist filed 112 and extract the pre-coloring information from netlist file 112.

In operation 1008, a layout pattern is developed based on the schematic circuit design and the pre-coloring information. The layout designer uses layout design block 116 to develop the layout pattern. In some embodiments, the layout pattern comprises more than one mask. The pre-coloring information provides information regarding whether certain features of the semiconductor device should be formed on a common mask. The pre-coloring information also provides information regarding the dimensions of features in the layout diagram.

In operation 1010, the layout pattern and the schematic circuit design are compared using the pre-coloring information. LVS comparison block 118 compares the layout pattern to the schematic circuit design to determined features of the layout design are situated on the proper mask and that the dimensions of the features comply with any instructions provided in the pre-coloring information.

In operation 1012, a parasitic simulation of the semiconductor device is performed using the extracted pre-coloring information. LPE block 120 uses the pre-coloring information for perform a simulation of the functionality of the semiconductor device. By using the pre-coloring information LPE block 120 is able to perform a more accurate simulation that is possible using conventional technology.

One aspect of this description relates to a semiconductor device design system. The semiconductor device design system includes a schematic design block configured to generate schematic information and pre-coloring information for a semiconductor device. The semiconductor device design system also includes a netlist file configured to store the schematic information and the pre-coloring information on a non-transitory computer readable medium. A layout design block is configured to design at least one mask based on the schematic information and the pre-coloring information. An LVS comparison block is configured to compare the at least one mask to the schematic information using the pre-coloring information.

Another aspect of this description relates to a method of designing a semiconductor device. The method includes generating schematic information and pre-coloring information using a schematic design tool and storing the schematic information and the pre-coloring information in a netlist file comprising a non-transitory computer readable medium. The method also includes designing at least one mask based on the schematic information and the pre-coloring information using a layout design block. The method also includes comparing the at least one mask with the schematic information using the pre-coloring information using an LVS comparison block.

Still another aspect of this description relates to a method of designing a semiconductor device. The method includes generating a schematic diagram of the semiconductor device using a schematic design block. The method also includes separating the schematic diagram into schematic information and pre-coloring information and storing the schematic information and the pre-coloring information in a netlist file. The method further includes extracting the pre-coloring information from the netlist file using an extraction block and transmitting the extracted pre-coloring information to at least one of a layout design block, an LVS comparison block or a layout parasitic extraction block.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A semiconductor device design system comprising:
  at least one processor;
  a schematic design block connected to the at least one processor configured to generate schematic information and pre-coloring information for a semiconductor device, wherein the schematic design block is configured to receive the pre-coloring information from a user, and the pre-coloring information includes mask number information;
  a netlist file connected to the at least one processor configured to store the schematic information and the pre-coloring information on a non-transitory computer readable medium;
  a layout design block connected to the at least one processor configured to design a plurality of masks based on the schematic information and the pre-coloring information, wherein the layout design tool is configured to receive the pre-coloring information from the extraction tool; and
  a layout versus schematic (LVS) comparison block connected to the at least one processor configured to compare the at least one mask to the schematic information and the pre-coloring information.

2. The semiconductor device design system of claim 1, further comprising a layout parasitic extraction block connected to the at least one processor configured to simulate parasitic resistance and capacitance of the circuit based on the schematic information and the pre-coloring information.

3. The semiconductor device design system of claim 1, further comprising an extraction block connected to the at least one processor configured to recognize the pre-coloring information stored on the netlist file based on a reference character.

4. The semiconductor device design system of claim 3, wherein the reference character is a combination of characters.

5. The semiconductor device design system of claim 1, wherein the pre-coloring information includes metal layer information.

6. The semiconductor device design system of claim 1, wherein the pre-coloring information includes feature dimension information.

7. The semiconductor device design system of claim 1, wherein the extraction tool is integrated into the layout design tool.

8. The semiconductor device design system of claim 1, wherein the schematic design block is integrated with at least one of the layout design block or the LVS comparison block.

9. The semiconductor device design system of claim 1, wherein the schematic design block is wirelessly connected to at least one of the layout design block or the LVS comparison block.

10. The semiconductor device design system of claim 1, wherein the mask number information includes information defining:
  a first feature of the semiconductor device is formed using a first mask, and
  a second feature of the semiconductor device is formed using a second mask different from the first mask.

11. A method of designing a semiconductor device, the method comprising:
  generating schematic information and pre-coloring information using a processor, wherein the pre-coloring information is received from a user and includes mask number information;
  storing the schematic information and the pre-coloring information in a netlist file comprising a non-transitory computer readable medium;
  designing a plurality of masks based on the schematic information and the pre-coloring information; and
  comparing the at least one mask to the schematic diagram based on the schematic information and the pre-coloring information.

12. The method of claim 11, further comprising simulating parasitic resistance and capacitance of the circuit based on the schematic information and the pre-coloring information.

13. The method of claim 11, further comprising extracting the pre-coloring information from the netlist file based on a reference character.

14. The method of claim 11, wherein designing the at least one mask comprises using pre-coloring information which includes metal layer information.

15. The method of claim 11, wherein designing the at least one mask comprises using pre-coloring information which includes feature dimension information.

16. The method of claim 11, further comprising:
  designing a plurality of masks, wherein a first feature of the semiconductor device is formed in a first mask of the plurality of masks and a second feature of the semiconductor device is formed in a second mask of the plurality of masks different from the first mask; and
  assigning the first feature to the first mask and the second feature to the second mask based on the pre-coloring information.

17. A method of designing a semiconductor device, the method comprising:
  generating a schematic diagram of the semiconductor device using a processor;
  separating the schematic diagram into schematic information and pre-coloring information and storing the schematic information and the pre-coloring information in a netlist file, wherein the pre-coloring information is received from a user and includes mask number information;
  extracting the pre-coloring information from the netlist file;
  transmitting the extracted pre-coloring information and the schematic information to at least one of a layout design block, a layout versus schematic (LVS) comparison block or a layout parasitic extraction block, wherein the layout design block is configured to design a plurality of masks based on the schematic information and the pre-coloring information.

18. The method of claim 17, further comprising:
  designing at least one mask for use in a photolithography process based on the schematic information and the pre-coloring information received by the layout design block;
  comparing the at least one mask with the schematic information and the pre-coloring information received by the LVS comparison block; and
  simulating parasitic resistance and capacitance of the circuit based on the schematic information and the pre-coloring information received by the layout parasitic extraction tool.

19. The method of claim 18, wherein designing the at least one mask comprises using pre-coloring information which further includes metal layer information or feature dimension information.

20. The method of claim 17, wherein extracting the pre-coloring information comprises recognizing a reference character used to designate the pre-coloring information stored on the netlist file.

21. A non-transitory computer readable medium comprising:
  a schematic design block configured to generate schematic information and pre-coloring information for a semiconductor device, wherein the schematic design block is configured to receive the pre-coloring information from a user, and the pre-coloring information includes mask number information;
  a netlist file configured to store the schematic information and the pre-coloring information on a non-transitory computer readable medium;
  a layout design block configured to design a plurality of masks based on the schematic information and the pre-coloring information, wherein the layout design tool is configured to receive the pre-coloring information from the extraction tool; and
  a layout versus schematic (LVS) comparison block configured to compare the at least one mask to the schematic information and the pre-coloring information.

* * * * *